March 19, 1963    A. J. SAMUEL    3,081,919
COMBINATION DISPENSING AND EXCESS PRESSURE RELIEF VALVE
Filed April 3, 1959    2 Sheets-Sheet 1
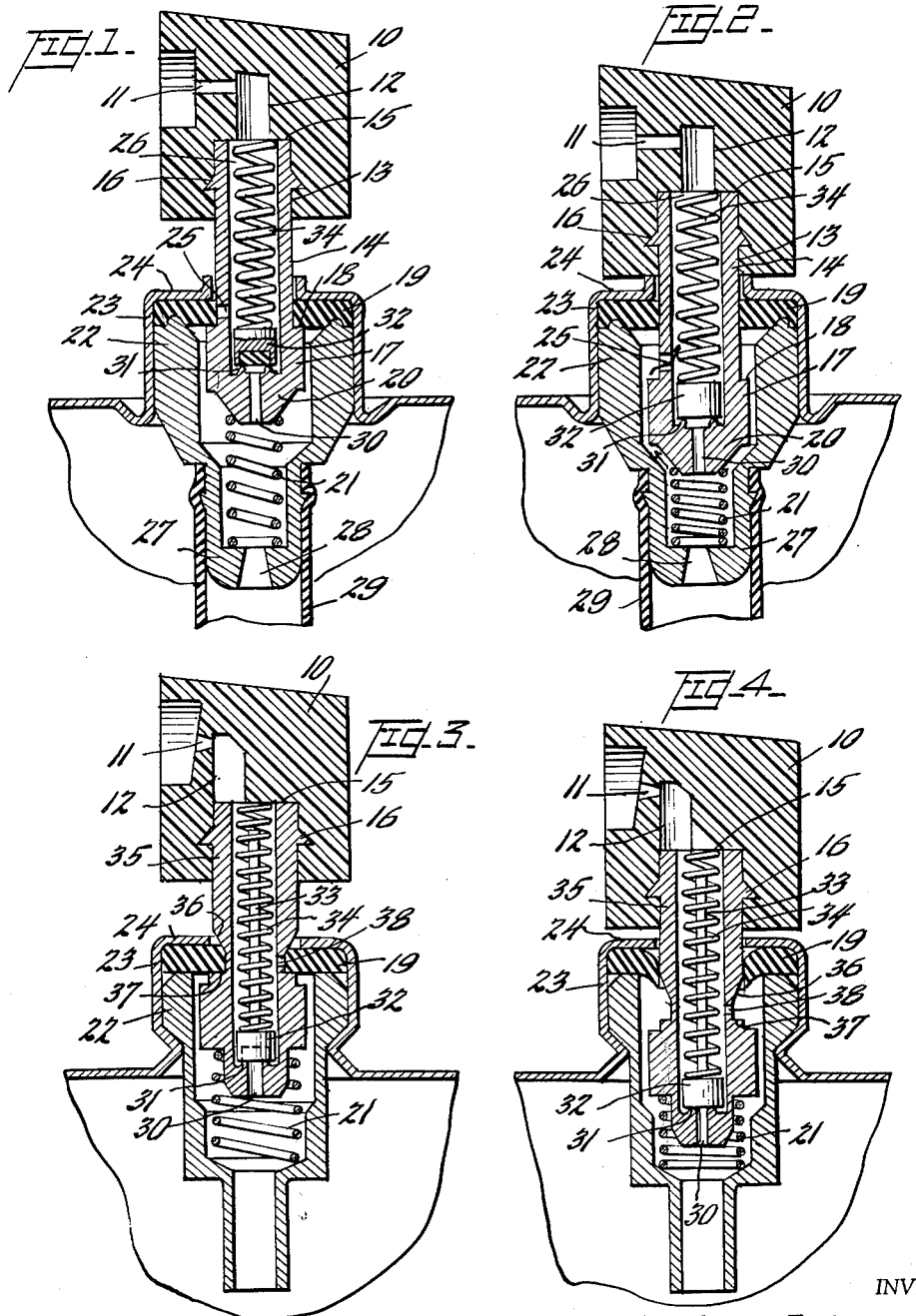
INVENTOR
Arthur J. Samuel,
BY Horace B. Cooker
ATTORNEY

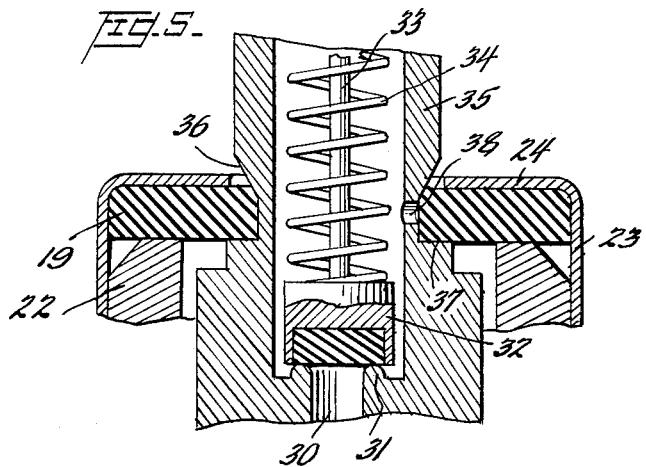
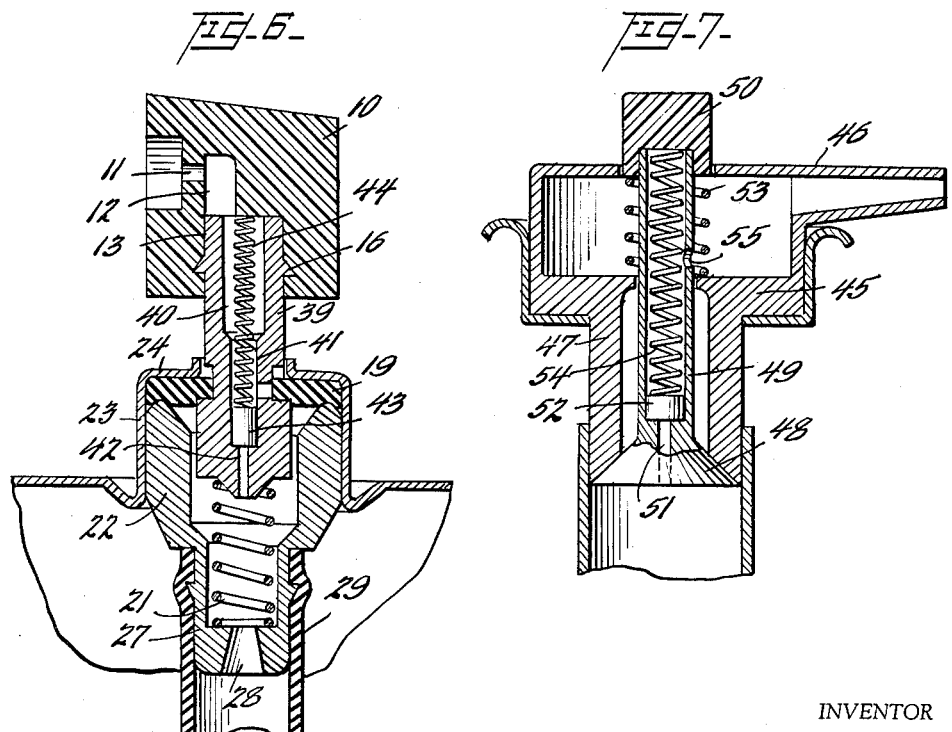

United States Patent Office 3,081,919
Patented Mar. 19, 1963

3,081,919
COMBINATION DISPENSING AND EXCESS
PRESSURE RELIEF VALVE
Arthur J. Samuel, Pittsburgh, Pa., assignor to Gulf Research & Development Company, Pittsburgh, Pa., a corporation of Delaware
Filed Apr. 3, 1959, Ser. No. 803,853
8 Claims. (Cl. 222—396)

This invention relates to improvements in valves for pressurized dispensers of the so-called aerosol type, and more particularly it comprises a valve for relieving abnormal pressure of the confined propellent gas if the dispensing receptacle becomes heated, such relief valve functioning to open briefly if pressure should moderately increase for any reason while the dispenser is not in use, but to be bodily ejected and thereby to afford an unobstructed, large passage to atmosphere for immediate and complete evacuation of the dispenser contents if heat input is at such a rate as to prevent reestablishment of normal pressure by the temporary opening of the relief valve.

According to the present invention, a spring loaded relief valve is mounted in the flow passage of a depressible discharge valve such as is commonly used in aerosol dispensers, which discharge valve is actuated either by finger pressure or by some such means as a motor driven cam to release the contents of the dispenser, the flow being through the discharge passage and an angularly directed spray orifice or nozzle. A fingerpiece or button which is detachably secured to the stem of the discharge valve to cap the flow passage therein is dislodged if heat flux to the dispensing receptacle is so great that pressure cannot be reduced by the temporary opening of the relief valve. In such case the button is popped off of the stem and the relief valve with its loading spring is expelled from the flow passage, thus opening the passage as a large vent to atmosphere so that danger of bursting the receptacle is avoided.

Pressurized dispensers have found wide use in spraying insecticides, hair lacquer, paints, powders and many other flowable substances. Considerations of cost require that they be cheaply made because they are non-refillable and are discarded when empty. They are therefore made of light gauge metal which is either extruded to shape or formed with seamed joints and which, although sufficiently strong to withstand the normal pressure of commonly used propellants such as carbon dioxide, halogenated hydrocarbon and nitrogen types, are likely to burst violently if the receptacle is incinerated, even though it is supposedly empty, or if it is left on a stove or radiator or should be highly heated by the sun in a store window display or on the shelf under the rear window of an automobile. Because of the dangerous and destructive consequences of careless handling, typical dispensers carry a warning label which cautions against leaving the device in any place where the temperature will exceed 110° F.

It has heretofore been proposed to provide some sort of safety means to guard against explosion, such as a fusible washer or plug which melts if the dispensing receptacle is too highly heated. However, such a means for relieving gas pressure is inferior to a spring loaded safety valve for several reasons. Highly volatile liquids of the halogenated hydrocarbon type as well as gaseous propellants of the nitrogen type are widely used, but both do not follow the same temperature-pressure curves. If a pressurized dispensing receptacle is provided with a meltable seal which can be safely used with a nitrogen system it will not be safe for use with a halogenated hydrocarbon. On the other hand, if the seal has such melting point that it will vent the receptacle when the halogenated hydrocarbon system reaches an unsafe pressure, it will vent a receptacle employing nitrogen as the propellant before the pressure rises to an extent which would be regarded as hazardous. In such case, with the propellant exhausted, any remaining contents of the dispenser will be inaccessible and consequently wasted.

From a reliability standpoint, it is considered more desirable to control the safety features of an aerosol dispenser by means which depends directly upon pressure rather than temperature. Thus, a spring loaded valve has the advantage that if the temperature of the receptacle only briefly and moderately exceeds a desired maximum, with accompanying increase in pressure, not all of the propellant will be lost, for the relief valve will again close when the pressure is reduced to normal, yet sufficient pressure will remain to permit continued use of the dispenser.

The spring loaded pressure relief valves employed in receptacles for volatile liquids and the like have heretofore provided only limited safety because they are irremovable and partially obstruct discharge from the receptacle. Even in the fully open position of such a valve free flow is retarded in venting the receptacle, possibly to such an extent that with rapid pressure build-up explosion will not be avoided, for the restricted spray orifice is not alone adequate to vent the receptacle under such conditions.

It is therefore an object of the invention to provide a pressure relief valve which will be bodily ejected from the dispensing receptacle and will thereby open an adequately large passage to atmosphere for rapid and complete evacuation of the contents of the receptacle before a dangerous rise in pressure of the contained propellant occurs, but which opens briefly upon moderate rise in pressure above a desirable limit to maintain a safe pressure within the container.

Another object of the invention is to provide a spring loaded relief valve for pressurized dispensers which is mounted in the stem of a depressible discharge valve, the stem being formed with a central flow passage capped at its outer end by a button which is dislodged by the flow of contents released by the relief valve before a dangerous rise in pressure occurs, whereupon the entire relief valve assembly will be ejected from the dispenser and its removal will open the central flow passage in the stem to unrestricted evacuation of the dispenser contents.

Further objects of the invention will be apparent from the following description and drawings wherein, FIGURES 1 and 2 are vertical sectional views of one form of depressible discharge valve with spring biased relief valve mounted therein, the discharge valve being shown in FIGURE 1 in its upper, closed position, and in FIGURE 2 in depressed, open position.

FIGURES 3 and 4 similarly show another form of discharge valve with pressure relief valve, the discharge valve being shown, respectively, in closed and open positions.

FIGURE 5 is an enlarged fragmentary sectional view of the valve shown in FIGURE 3.

FIGURE 6 is a vertical sectional view of yet another form of discharge valve which incorporates a pressure relief valve in accordance with this invention.

FIGURE 7 is a vertical section of a further form of depressible valve in which a pressure relief valve is so mounted as to accomplish the purposes of this invention.

Referring more particularly to the drawings, and first to FIGURES 1 and 2, the manually actuated valve comprises a button or fingerpiece 10 which is formed with a restricted spray orifice 11 and a communicating stepped bore 12 and 13 into which a stem 14 is entered to abut the shoulder 15 at the juncture of the larger and smaller bores. The fingerpiece, which is conventionally made of plastic or some other slightly yieldable material, may be secured to the stem by a press fit; for example, the stem may be formed with an annular ridge 16 which snaps into a mating groove in the fingerpiece when the two are assembled. In any case, the fingerpiece is so secured to the stem as to be dislodged by outwardly exerted force. The lower end of the stem has an enlarged head 17 which has a shoulder 18 on its upper surface against which a flexible sealing gasket 19 presses and limits outward movement of the stem, while the under surface of the stem is formed with a frusto-conical surface 20 which centers the valve spring 21. The housing 22 of the manual valve is fixed in a hollow boss 23, called in trade terminology a "turret," in the top of the dispensing receptacle, the boss having an inwardly directed flange 24 overlying and retaining the gasket 19 which closely surrounds the stem to prevent leakage therearound.

A side port 25 in the stem of the discharge valve is so located as to be exposed to the interior of the dispensing receptacle when the stem is depressed, as shown in FIGURE 2. In this position the port establishes communication between the interior of the receptacle and the central flow passage 26 in the stem, which leads to the discharge orifice in the fingerpiece. The valve housing 22 terminates at its lower end in a nipple 27 which has an opening 28 leading to its interior from an eduction tube 29 which extends into the lower part of the dispensing receptacle, and the stem 14 likewise has a smaller diameter bore 30 constituting a fluid passage in its lower end. An annular, raised seating surface 31 which is formed in the shoulder at the juncture of the large and small bores in stem 14 serves as a seat for the pressure relief valve now to be described.

The relief valve comprises a member 32 which is received within the larger bore or flow passage 26 of the stem and which seats over the small diameter bore 30. A spiral spring 34 which abuts the relief valve 32 at one end and the shoulder 15 within the fingerpiece at its other end normally urges the relief valve to its seat closing the relief passage.

When the fingerpiece and attached stem are pressed downwardly into contact with the boss on the dispensing receptacle the side port in the stem will clear the under edge of the sealing gasket and fluid will be discharged around the head of the stem and through the side port, as shown by arrows in FIGURE 2, and after flowing through the bore of the stem and the smaller bore of the fingerpiece will emerge at the restricted discharge orifice in the fingerpiece. When manual pressure on the fingerpiece is released the stem is returned to initial position in which the side port is removed from communication with the interior of the dispensing receptacle, as shown in FIGURE 1. In this position of the stem the sealing gasket is in a position interposed between the side port and the interior of the receptacle, and the relief passageway at the lower end of the stem is closed by the spring pressed relief valve. The dispenser is thus sealed. Should pressure within the dispenser rise moderately to an undesirable level the relief valve will open briefly to reduce it. However, with continued incremental heating the relief valve remains partly open and pressure begins to develop in the flow passage 26 and its connected passage downstream of the relief valve. With still more heating of the dispenser contents, incremental increase of pressure causes the relief valve to open wider, that is to say the orifice 30 is effectively increased in diameter. The pressure in the space downstream of the relief valve begins to approach the pressure in the upstream space after orifice 30 becomes effectively larger than spray orifice 11. Orifice 11 in the fingerpiece is usually in the range of from 0.012 to 0.030 inch in diameter and the fully open orifice 30 is larger, namely up to 0.0625 inch for a spray orifice within the stated range. In addition to the fluid pressure thus applied to force the fingerpiece from the stem, the kinetic energy of the stream flowing to the spray orifice 11 and striking the under surface of the fingerpiece assists in dislodging it, so permitting the entire relief valve assembly to be ejected and consequently leaving an unobstructed, straight-through path for the instantaneous relief of pressure.

In FIGURES 3 and 4, wherein parts similar to those of FIGURES 1 and 2 are referred to by the same reference numerals, the principal structural difference lies in the stem of the manual valve and in the provision of a pin on the relief valve which affords internal support for its biasing spring. Here, the stem 35 has a necked portion lying between an inwardly beveled surface 36 and an abrupt shoulder 37 on which the sealing gasket 19 rests when the valve is closed. In this position the side port 38 is covered by the gasket, as shown in greater detail in FIGURE 5. When, however, the fingerpiece is depressed the beveled surface of the stem flexes and spreads the gasket, in the manner illustrated in FIGURE 4, and the side port is thereupon opened to the interior of the dispensing receptacle. In this assembly the pressure relief valve is as above described except for the addition of a pin 33 which prevents the spring from buckling if the flow passage is of considerably larger diameter.

In the further modification shown in FIGURE 6, and again employing similar reference numerals for similar parts shown in the preceding figures, the valve stem 39 has a large downstream bore 40 which is a continuation of a smaller upstream bore 41 and a terminal upstream passage 42 of even smaller diameter to afford successively larger space through which the fluid rushes in relieving excess pressure. In this form of the invention the relief valve constitutes a cylindrical plug 43 which is pressed to a flat seat surrounding the terminal passage 42 by a spring 44.

FIGURE 7 shows yet another adaptation of the pressure relief valve to a pressurized dispenser. Here the discharge valve body 45 is formed in one piece with a spout or nozzle 46, and the tubular portion 47 which lies within the dispenser has a large, frusto-conical seating surface against which a complementary shaped head 48 of a manually depressible valve stem 49 bears to seal the receptacle when it is not in use. The valve stem is tubular and is capped at its upper end by a fingerpiece 50, while its frusto-conical lower end has a central fluid passageway 51 of sufficiently smaller diameter than the hollow body portion of the stem to provide a seat for a relief valve 52. A helical spring 53 surrounding the stem and bearing upon the fingerpiece 50 normally urges the enlarged head of the stem to its seat to seal the dispenser and to return the discharge valve to sealing position after it has been depressed for dispensing. The hollow interior of stem 49 houses a helical spring 54 which is compressed between the relief valve 52 and the fingerpiece 50 to urge the valve to its seat but which allows the valve to open under excessive pressure, whereupon pressure is relieved by flow through the stem 49 and outwardly through a side port 55 to the larger diameter orifice in the nozzle of the receptacle.

It will be evident from the foregoing description that the pressure relief valve herein described is adaptable to various pressurized receptacles and to numerous discharge valves of different designs, and is not restricted in its application to the specific embodiments herein shown by way of illustration.

I claim:

1. A combination dispensing and excess pressure relief valve comprising a valve housing with an open inlet end, means defining a dispensing passageway extending through said housing, a first moveable valve member and cooperative valve seat sealing said dispensing passageway, said first moveable valve member being moveable in a direction against fluid pressure from said inlet end of said housing to open said dispensing passage-way, a second moveable valve member and cooperative valve seat substantially coaxial with said first moveable valve member, and sealing said housing from the flow of fluid therethrough from said inlet end, said second moveable valve member being moveable in a direction with fluid pressure from said inlet end of said housing to open said housing for the flow of fluid therethrough from said inlet end, and means resiliently urging said second valve member closed with a pre-determined force.

2. A valve according to to claim 1, including spring means resiliently urging said first valve member in sealing engagement against its cooperative seat.

3. A valve according to claim 2 in which said means for resiliently urging said second valve member is a spring.

4. In a pressurized dispenser having a manually actuated discharge valve the stem of which is depressed for discharge of the contents of the dispenser, a pressure relief valve comprising a movable valve member mounted within the stem of the manually actuated discharge valve to control a straight fluid passageway extending therethrough from end to end, a fingerpiece fitting the upper end of the stem and separable therefrom by upward force, and a biasing spring bearing upon the pressure relief valve at one end and upon the under side of the fingerpiece for biasing the pressure relief valve to closed position under conditions of normal pressure, but adapted when compressed by opening of the relief valve under excessive pressure to separate the fingerpiece from the stem and thereby open a straight-through passage for ejection of the relief valve and spring to afford unobstructed flow of the dispenser contents to atmosphere.

5. A reciprocable valve for pressurized dispensing receptacles, comprising a stem having a straight fluid passageway extending therethrough from end to end, the passageway being of progressively larger diameter in downstream direction and defining an annular seating surface for a pressure relief valve, a pressure relief valve mounted in the passageway in said stem, a fingerpiece detachably secured to the downstream end of said stem, and a spring mounted in the fluid passageway for biasing the pressure relief valve to closed position under normal pressure conditions, but adapted when compressed by opening of the relief valve under excessive pressure to separate the fingerpiece from the stem and thereby open a straight-through passage for ejection of the relief valve and spring to afford unobstructed flow of the dispenser contents to atmosphere.

6. In a pressurized dispenser having a manually actuated discharge valve the stem of which is depressed for discharge of the contents of the dispenser under pressure of a confined propellant, a pressure relief valve comprising a slidable valve member mounted in the discharge valve stem to control a straight passageway extending therethrough from end to end, the passageway downstream of said relief valve being of such diameter as to permit the relief valve to pass freely therethrough, a fingerpiece capping the downstream end of the stem and detachable therefrom by outward force, and a spring mounted within the fluid passageway and bearing upon the under side of said fingerpiece for biasing the relief valve to closed position under normal conditions of pressure within the dispenser, but adapted when compressed by opening of the relief valve under excessive pressure to separate the fingerpiece from the stem and thereby open a straight-through passage for ejection of the relief valve and spring to afford unobstructed flow of the dispenser contents to atmosphere.

7. A pressure relief valve for pressurized receptacles comprising in combination with a manually actuated discharge valve having a depressible stem which constitutes a housing for a reciprocable relief valve member, a fingerpiece capping the upper end of the stem and frictionally fitting the same, a pressure relief valve member mounted for sliding movement within the stem in a straight bore which extends into the stem from its upper end to adjacent its lower end and which is of larger diameter throughout than the diameter of the relief valve member received therein, the lower portion of said stem being formed with a continuing bore of smaller diameter than that aforesaid, such continuing bore extending to the lower end of the stem and defining at its juncture with the larger bore an internal upwardly facing shoulder constituting a seat for the relief valve member, and a helical spring located between the relief valve member and fingerpiece for biasing the relief valve member to closed position under normal pressure within the receptacle, whereby before internal pressure creates a hazard of bursting the fingerpiece will be dislodged and the relief valve member will be ejected from the stem for unimpeded escape of pressuring gas from the receptacle.

8. In a pressurized dispensing receptacle of the type which is discharged by finger pressure on a spring biased valve stem, the improvement comprising a straight valve stem having an axial bore the upper portion of which is of larger diameter throughout than that of the lower portion, an upwardly facing annular shoulder at the juncture of the upper and lower portions of the bore, a relief valve seating on said shoulder and slidable within the upper portion of the bore, the fingerpiece being removable from the stem by force applied to the under surface thereof, and a spring mounted within the upper portion of bore adapted to bias the relief valve to closed position on its seat when pressure within the receptacle does not exceed a safe value, but adapted when compressed by opening of the relief valve under excessive pressure to separate the fingerpiece from the stem and thereby open a straight-through passage for ejection of the relief valve and spring to afford unobstructed flow of the dispenser contents to atmosphere.

References Cited in the file of this patent
UNITED STATES PATENTS

| | | |
|---|---|---|
| 1,212,102 | Pipe | Jan. 9, 1917 |
| 1,527,358 | Hamilton | Feb. 24, 1925 |
| 2,818,202 | Abplanalp | Dec. 31, 1957 |
| 2,924,237 | Ellis | Feb. 9, 1960 |